J. E. OLLIVIER.
PNEUMATIC RUNNER FOR VEHICLE SLEDS.
APPLICATION FILED APR. 13, 1915.
1,177,263.
Patented Mar. 28, 1916.
3 SHEETS—SHEET 1.
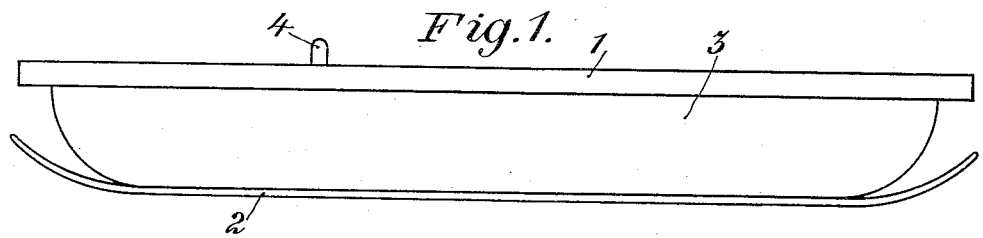
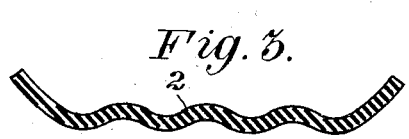
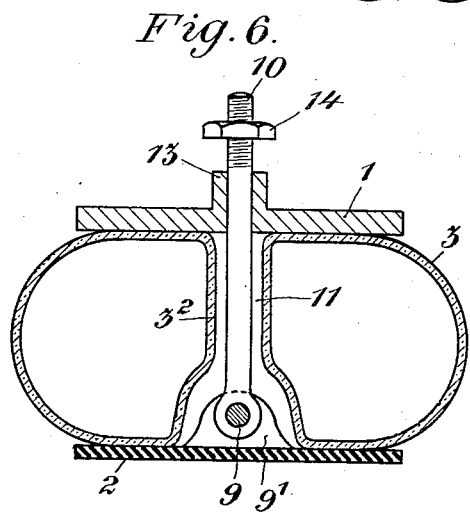
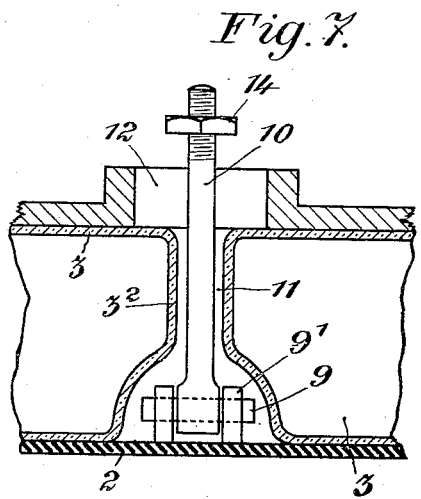
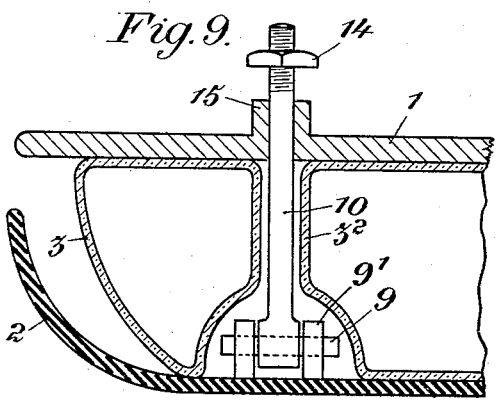
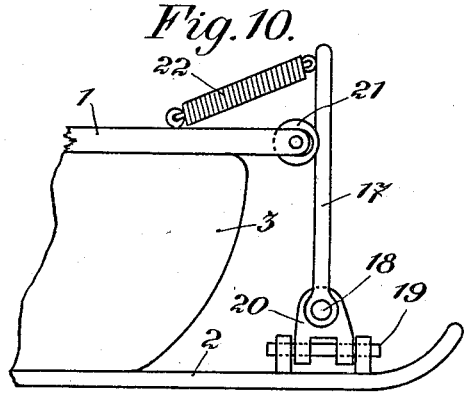
Inventor
Jocelyn E. Ollivier
By Serrell & Son
his attorneys.

J. E. OLLIVIER.
PNEUMATIC RUNNER FOR VEHICLE SLEDS.
APPLICATION FILED APR. 13, 1915.
1,177,263.
Patented Mar. 28, 1916.
3 SHEETS—SHEET 2.
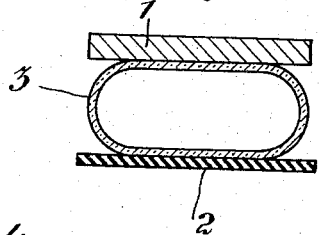
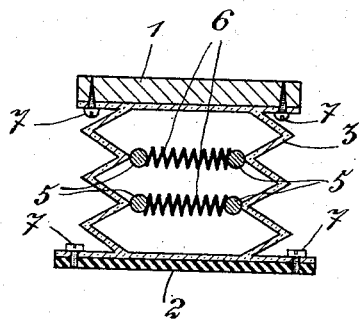
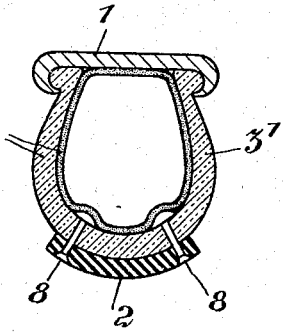
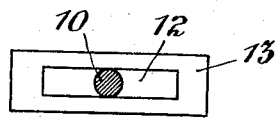
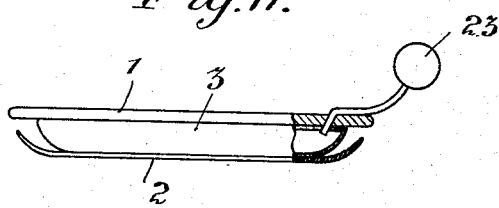
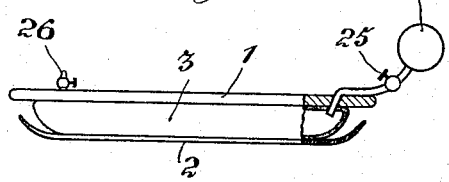
Inventor
Jocelyn E. Ollivier
By
his attorneys

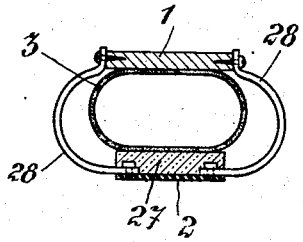
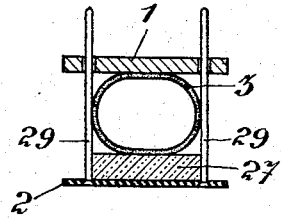
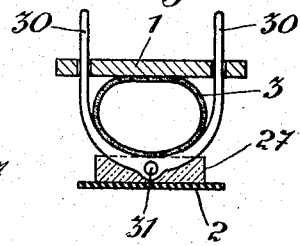
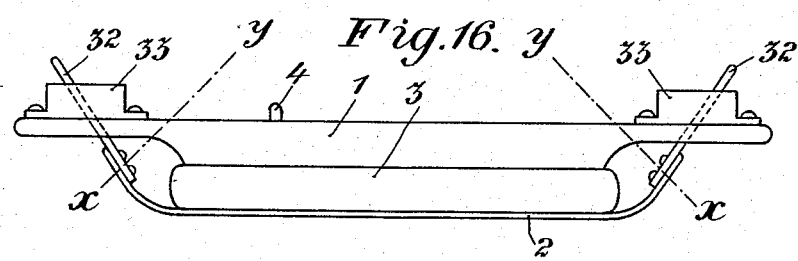
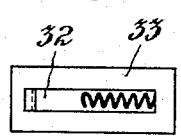
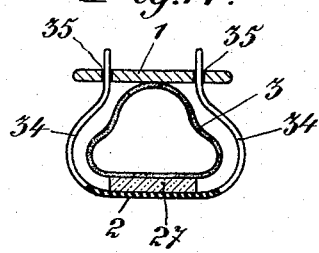
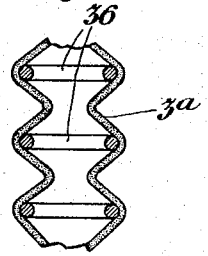
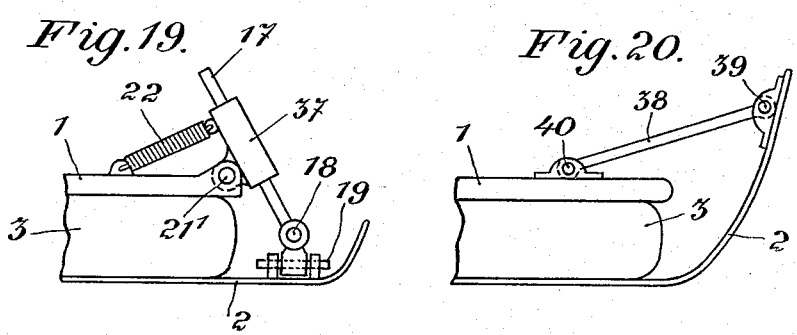
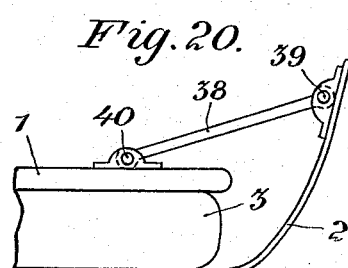
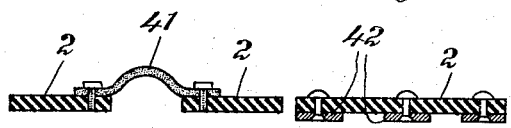

UNITED STATES PATENT OFFICE.

JOCELYN EMILE OLLIVIER, OF ST. GERVAIS, FRANCE.

PNEUMATIC RUNNER FOR VEHICLE-SLEDS.

1,177,263. Specification of Letters Patent. Patented Mar. 28, 1916.

Application filed April 13, 1915. Serial No. 21,007.

*To all whom it may concern:*

Be it known that I, JOCELYN EMILE OLLIVIER, a citizen of France, residing at St. Gervais, Department of Haute Savoie, in the Republic of France, have invented certain new and useful Improvements in Pneumatic Runners for Vehicle-Sleds, of which the following is a specification.

This invention relates to pneumatic runners for vehicle sleds which are especially adapted for auto-sleighs.

The invention consists in inserting between the flexible blade sliding on snow or ice and the frame work supporting the body of the vehicle a flexible chamber filled with compressed gas, as for instance with compressed air, in order to soften the shocks on persons and goods carried and to adapt the runner to the roughness of frozen ground. The runner may also be provided with springs but not necessarily. According to this arrangement the load will be evenly distributed along the whole length of the runner instead of acting only on the very parts where the springs are attached to the runner and to the frame, as was hitherto ordinarily the case.

The annexed drawings represent as examples several forms of the invention.

Figures 1 and 2 are side elevations and cross sections of a sledge runner. Fig. 3 is a particular form of the blade of a runner in cross section. Figs. 4 and 5 are cross sections of different forms of the elastic part. Fig. 6 is a cross section of the runner on the axis of a rod. Fig. 7 represents the manner of guiding a rod as seen in a longitudinal section of the runner. Fig. 8 is a plan view of the same. Fig. 9 is a longitudinal section of the fore part of a sledge runner, and Fig. 10 is a side elevation showing the manner of connection between the frame and sledge runner. Fig. 11 and Fig. 12 illustrate the combination of a reservoir of air with a sledge runner. Figs. 13, 14 and 15 show cross-sections of several forms of sledge runners. Fig. 16 is a side elevation of a sledge runner and Figs. 17 and 18 are cross sections showing details of construction. Fig. 16$^a$ is a plan of the same. Figs. 19 and 20 illustrate guiding devices for the ends of the blades, and Figs. 21 and 22 show different forms of blades in cross-section.

The pneumatic sledge runner made in accordance with my invention always comprises three main parts, to wit: 1st. A rigid frame whereon the body of the vehicle is fixed (such as seats, tables, etc.). 2nd. A flexible blade to slide on the surface over which the vehicle travels. 3rd. An air chamber made of an elastic body filled with a compressed gas.

In Figs. 1 and 2, a slide runner is seen in side elevation and in cross section and provided with a rigid frame 1, a steel blade 2 and an air chamber 3. 4 is a valve for admitting the air or other gas to the chamber, which extends across the frame 1.

Fig. 3 illustrates a modified form of the blade 2, provided with undulations which act like claws to prevent the vehicle from skidding.

Fig. 4 shows another form of the air chamber, made of leather and folded like an accordion, its folds being provided with metallic bars 5 set lengthwise and connected to each other by springs 6. The bellows thus formed are attached partly to the frame 1 and partly to the blade 2 by means of bolts or rivets 7.

Fig. 5 shows a form of runner with the air chamber 3 inclosed by a cover $3^1$ of a cross section similar to that of the shoes of auto car tires. The frame 1 is adapted to grip the cover $3^1$ and the blade 2 is fixed to the cover $3^1$ by means of bolts 8.

Figs. 6 and 7 show in cross-section and longitudinal section devices for connecting the frame to the blade without interfering with the elastic movements of the air chamber 3.

The blade 2 is provided with suitably spaced hinges $9^1$, each with a pin 9, which engages an eye at the end of a bolt 10, said bolt being free to slide within a longitudinal guide piece 12 of the frame 1 having a flanged part 13 (see Fig. 8). The air chamber 3 is fitted at this place with a wall $3^2$ for the bolt 10, said bolt being provided with a nut 14. This arrangement will leave the blade 2 free to move, dependent upon the undulations of the ground, without interfering with the connecting bolts.

Fig. 9 shows a form of connection between the blade 2 and the frame 1 at the end of the sleigh runner. Here the bolt 10 crosses the frame 1 within a cylindrical collar piece 15.

Fig. 10 shows another form of this end connection. Here the blade 2 is connected to the rod 17 by means of a universal joint 18, 19, 20. The rod 17 bears against a grooved friction roller 21 which is carried at the end of the frame 1 and a cylindrical spring 22 maintains said rod in engagement with said roller.

Fig. 11 shows diagrammatically a sleigh runner, the air chamber 3 of which is combined with a gas reservoir 23, intended to regulate the rapid changes of pressure produced within the air chamber 3 during heavy shocks on rough ground.

Fig. 12 represents a sleigh runner whereof the air chamber 3 is combined with a reservoir for compressed air 24 and separated from it by a valve 25. The pressure in the reservoir must be greater than in the chamber 3 in order to fill the latter by opening the valve 25 when it becomes slack during traveling. An escape valve 26 makes it possible to reduce the pressure within the chamber 3 if desired.

Fig. 13 shows in cross section a sleigh runner where a fillet 27 of a yielding material (for instance leather or rubber or leather covered with a thin strip of sheet metal) is inserted between the air chamber 3 and the blade 2. Other flexible fillets 28 (for instance of leather) connect the frame 1 to the blade 2 laterally for protection's sake.

In Fig. 14 the blade 2 is provided with lateral rods 29 crossing the frame 1 without crossing the air chamber 3. These rods are intended for the same purposes as the rods 10 in Figs. 6 and 7.

Fig. 15 is a modified form where the fillet 27 attached to the blade 2 is fitted with forks 30 connected to a pivot 31 and crossing the frame 1 without crossing the air chamber 3.

Fig. 16 shows in side elevation a sleigh runner where the blade 2 is provided at its ends with inclined rigid bars 32 guided within pieces 33 (Fig. 16$^a$) attached to the frame 1. Bars 32 may also be arranged vertically or be inclined in the direction to coincide with the lines $x$—$y$.

In Fig. 17 the blade 2 is fitted with bent up portions 34 which cross slots 35 arranged longitudinally within the frame 1. These slots 35 could also be fitted with friction rollers or ball bearings.

Fig. 18 shows a detail of construction referring to the arrangement of parts in Figs. 6 and 9. In order to secure a safe working of the elastic walls 3$^a$ wherein the bolts 10 cross the air chamber 3, said wall may also be folded like an accordion and fitted with metallic rings or spirals 36.

Fig. 19 is a modified form of the device shown in Fig. 10. The blade 2 is joined to the frame 1 by means of the bar 17 connected to the blade by means of a universal joint 18, 19; this bar extends through a guiding sleeve 37 hinged to the frame 1 at 21$^1$ and it is also connected to it by means of the helical spring 22.

In Fig. 20 the bent up end of blade 2 is attached to the frame $i$ by means of a rod 38 hinged at 39 to the blade and at 40 to the frame.

Fig. 21 shows a blade 2 made of two metallic strips joined to each other by a flexible fillet 41 which may be of leather.

Fig. 22 shows a blade the bottom of which is fitted with longitudinal metallic strips 42 intended to prevent skidding.

I claim as my invention:

1. A runner for vehicle sleds comprising a frame, a flexible runner blade, and an intermediate elastic member adapted to be inflated with gas and to exert a uniform pressure over the entire bearing surface of the runner blade.

2. A runner for vehicle sleds comprising a frame adapted to be secured to a vehicle body, a flexible runner blade, an elastic member intermediate of the frame and flexible runner blade, and adapted to be filled with gas to exert a uniform pressure against the bearing surface of the flexible runner blade, and means for connecting said elastic member to the said frame and the flexible runner blade.

3. A runner for vehicle sleds comprising a frame adapted to be secured to a vehicle body, a flexible runner blade, an elastic member intermediate of the frame and runner blade and adapted to be filled with gas to exert a uniform pressure against the bearing surface of the runner blade to cause the same to conform to the contour of the surface over which it passes, means for connecting the elastic member to both the said frame and said flexible runner blade, and means for admitting gas to the interior of the said elastic member.

4. A runner for vehicle sleds comprising a frame adapted to be secured to a vehicle body, a flexible runner blade, an elastic member intermediate of the frame and runner blade and adapted to be filled with gas to exert a uniform pressure against the bearing surface of the runner blade to cause the same to conform to the contour of the surface over which it passes, means for connecting the elastic member to both the said frame and said flexible runner blade, means for admitting gas to the interior of the said elastic member and means for permitting the gas to escape from the elastic member.

In testimony whereof I have affixed my signature in presence of two witnesses.

JOCELYN EMILE OLLIVIER.

Witnesses:
Dr. Rod. de Wurstunberge,
Louis H. Munier.

Copies of this patent may be obtained for five cents each, by addressing the "Commissioner of Patents, Washington, D. C."